(12) United States Patent
Lemaistre

(10) Patent No.: US 7,959,428 B2
(45) Date of Patent: *Jun. 14, 2011

(54) DEVICE FOR BLOWING THERMOPLASTIC CONTAINERS

(75) Inventor: Eric Lemaistre, Octeville sur Mer (FR)

(73) Assignee: Sidel Participations, Octeville sur-Mer (FR)

( * ) Notice: Subject to any disclaimer, the term of this patent is extended or adjusted under 35 U.S.C. 154(b) by 0 days.

This patent is subject to a terminal disclaimer.

(21) Appl. No.: 12/574,567

(22) Filed: Oct. 6, 2009

(65) Prior Publication Data

US 2010/0021581 A1   Jan. 28, 2010

Related U.S. Application Data

(62) Division of application No. 11/629,855, filed as application No. PCT/FR2005/001531 on Jun. 17, 2005, now Pat. No. 7,674,108.

(30) Foreign Application Priority Data

Jun. 23, 2004 (FR) ...................... 04 06844

(51) Int. Cl.
*B29C 49/58* (2006.01)
(52) U.S. Cl. ........................ 425/182; 425/535
(58) Field of Classification Search .......... 425/182, 425/529, 535
See application file for complete search history.

(56) References Cited

U.S. PATENT DOCUMENTS

| | | |
|---|---|---|
| 3,640,671 A | 2/1972 | Reilly |
| 3,819,317 A | 6/1974 | Higginbotham |
| 3,993,427 A | 11/1976 | Kauffman et al. |
| 4,009,980 A | 3/1977 | Armour et al. |
| 4,052,187 A | 10/1977 | Spaeth et al. |
| 4,131,665 A | 12/1978 | Bodson et al. |
| 4,173,447 A | 11/1979 | Bradbury |
| 4,214,860 A | 7/1980 | Kleimenhagen et al. |
| 4,596,271 A | 6/1986 | Brundage |
| 5,182,122 A | 1/1993 | Uehara et al. |
| 5,253,676 A | 10/1993 | Craig |
| 5,328,351 A | 7/1994 | Schonebeck |
| 5,501,253 A | 3/1996 | Weiss |
| 5,642,756 A | 7/1997 | Lawrence et al. |

(Continued)

FOREIGN PATENT DOCUMENTS

DE      26 57 670      6/1977

(Continued)

OTHER PUBLICATIONS

Derwent Abstract of DE 203 05 232 U1 dated May 28, 2003.

(Continued)

*Primary Examiner* — Robert B Davis
(74) *Attorney, Agent, or Firm* — Sughrue Mion, PLLC

(57) ABSTRACT

A device for blowing, with the aid of a pressurized fluid, containers from thermoplastic blanks closed in a blow mold including a nozzle whose end is functionally and sealingly connected to the neck of the blank and includes several solenoid valves for selectively connecting the nozzle to the source of a moderately pressurized pre-blowing fluid, to the source of a highly-pressurized blowing fluid and to an exhaust for discharging the pre-blowing/blowing fluid, respectively. The inventive device also includes a body which is mechanically associated with the nozzle, incorporates at least one reception area for receiving a solenoid valve and is selectively connectable to the nozzle.

16 Claims, 6 Drawing Sheets

U.S. PATENT DOCUMENTS

| | | | |
|---|---|---|---|
| 5,648,026 A | 7/1997 | Weiss | |
| 6,464,486 B1 | 10/2002 | Barray et al. | |
| 6,688,325 B2 | 2/2004 | Hettinger | |
| 6,905,326 B2 | 6/2005 | Voth et al. | |
| 2002/0020445 A1 | 2/2002 | Hettinger | |
| 2003/0118686 A1 | 6/2003 | Voth et al. | |
| 2008/0213423 A1* | 9/2008 | Leblond et al. | 425/536 |

FOREIGN PATENT DOCUMENTS

| | | |
|---|---|---|
| DE | 26 57 671 | 6/1977 |
| DE | 195 43 440 A1 | 5/1997 |
| DE | 203 05 232 U1 | 5/2003 |
| EP | 0 891 855 A2 | 1/1999 |
| EP | 1 328 396 A1 | 7/2003 |
| FR | 2 336 301 A1 | 7/1977 |
| WO | 97/32150 A1 | 9/1997 |
| WO | 02/34500 A1 | 5/2002 |

OTHER PUBLICATIONS

"Bosh Hydraulique, de la theorie a la pratique", printed in Apr. 1997, pp. 260, 261, 286 and 287.

"Blow Molding Handbook" 1989, pp. 8-27, 5, 15-16, 22, 34, 91-95, 108-109, 259-260.

International Search Report dated Nov. 18, 2005.

* cited by examiner

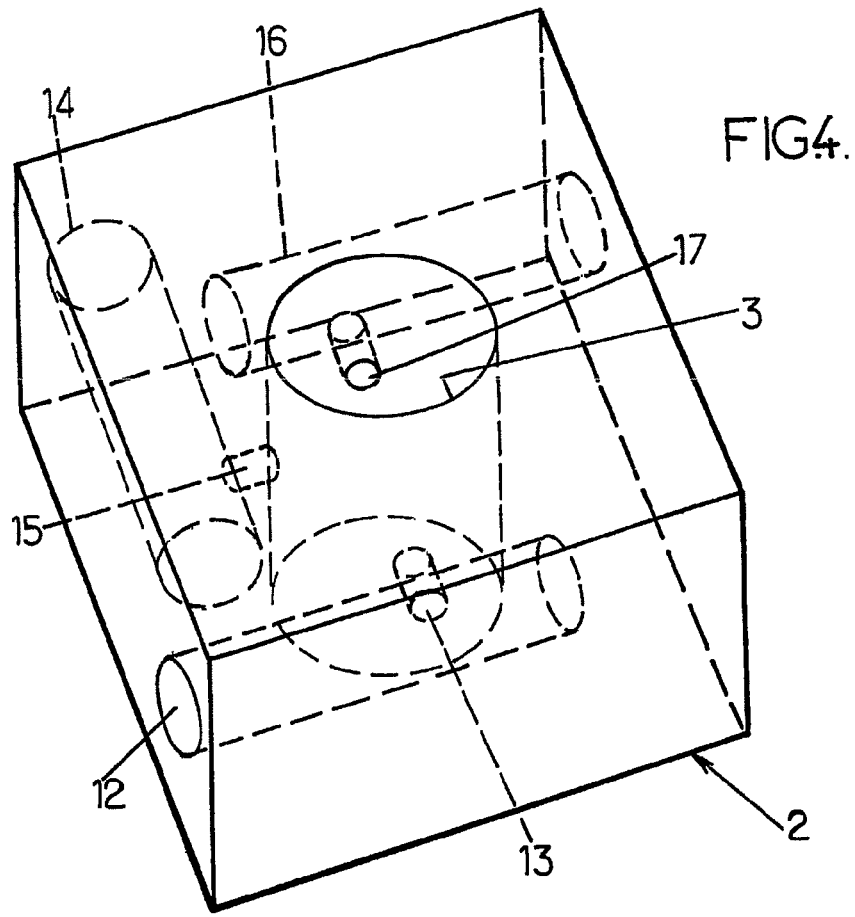
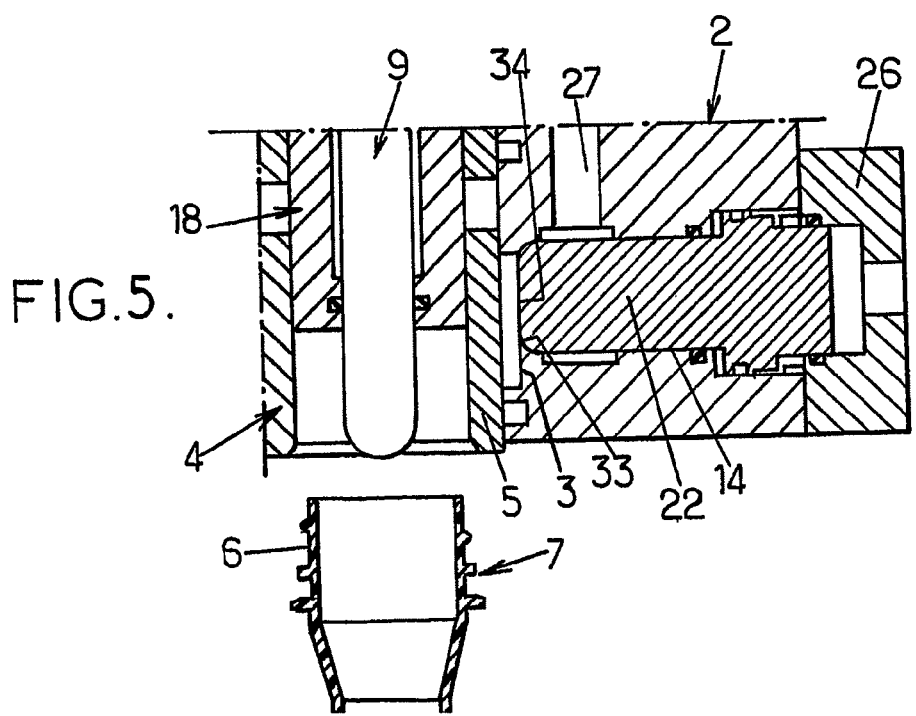

DEVICE FOR BLOWING THERMOPLASTIC CONTAINERS

CROSS REFERENCE TO RELATED APPLICATIONS

This is a divisional of application Ser. No. 11/629,855 filed Dec. 18, 2006, which is a 371 of PCT/FR/2005/01531 filed Jun. 17, 2005, which claims foreign priority from FR 04/06844, filed on Jun. 23, 2004. The entire disclosure of the prior application, application Ser. No. 11/629,855, is hereby incorporated by reference.

FIELD OF THE INVENTION

The present invention generally relates to the field of manufacturing containers made from thermoplastic material, such as PET or PEN, by a blowing or stretch-blowing method from a blank (preform or intermediate container) and it relates more specifically to improvements made to devices for blowing, by means of a pressurized fluid, containers from thermoplastic blanks, of which the body is enclosed in a blowing mold, said devices comprising a nozzle consisting of an end formed to be functionally and sealingly connected to the neck of a blank and comprising a plurality of solenoid valves for selectively connecting said nozzle to, for example, respectively a source of fluid at moderate pressure for pre-blowing, a source of fluid at high pressure for blowing and an exhaust for discharging the pre-blowing/blowing fluid.

BACKGROUND OF THE INVENTION

As known, the nozzle is designed to be axially mobile, in its entirety or partially, above the blowing mold between an upper position or raised position in which the nozzle is not functional (opening and closing of the mold allowing the loading of a blank and the release of the molded container) and a lower position or blowing position in which the end of the nozzle cooperates sealingly either with the neck of the blank, or with the face of the mold above which the neck of the blank projects and in which the nozzle is functional.

Blowing devices are known in which the end of the nozzle, in the functional position, cooperates positively with the neck of the blank and either sealingly abuts against the lip (edge) of the neck of the blank, or is sealingly fitted into or onto the neck of the blank.

Blowing devices are also known in which the end of the nozzle is configured in the shape of a bell which is larger than the neck of the blank and caps said neck by being sealingly supported at the front against the face of the mold on which the neck of the blank projects (see, for example, the document FR 2 764 544).

A blowing sequence normally consists of a step of pre-blowing the blank by means of a fluid (generally air) at moderate pressure (for example $7 \times 10^5$ Pa), then the blowing step itself, at high pressure (for example $40 \times 10^5$ Pa) generally accompanied by mechanical axial stretching by means of a stretch rod and finally an exhaust step with the discharge of the pre-blowing/blowing air. For these various steps, three respective solenoid valves are controlled sequentially which, on the one hand, are respectively connected to a source of fluid at moderate pressure, a source of fluid at high pressure and an exhaust and which, on the other hand, are connected to the nozzle.

A blowing device of the type under consideration consumes a very large amount of pressurized fluid, whether at moderate or high pressure. The constant production of pressurized fluid (air) in large quantities leads to a very high consumption of electrical energy for the functioning of the compressor(s). As a result, there is a constant and urgent demand on the part of the users of these blowing devices for as large a reduction as possible of the quantity of pressurized fluid used, so as to reduce the consumption of electrical energy.

It must be understood that the only useful volume for the blowing operation is the volume of the container forced into its final shape against the walls of the molding cavity of the mold, in other words, substantially the volume of the molding cavity. In contrast, all the volumes located between the outlet of the pre-blowing or blowing solenoid valve and the neck of the container are, strictly speaking, volumes which are superfluous for the deformation of the blank and are therefore dead volumes. At each step for pre-blowing and blowing a blank, these dead volumes are filled with pressurized fluid in the same manner as the useful volume, which involves a production of pressurized fluid which is substantially greater than the actual requirement. The dead volumes are of a size which is not inconsiderable relative to the useful volumes and any reduction of these dead volumes proves beneficial in terms of a possible reduction in the power of the fluid compressor and therefore of its cost, and in terms of reducing the electrical energy required for the functioning of the compressor.

In a first design of the blowing device, the solenoid valves were grouped together on a fixed base mounted on the frame remote from the nozzle. A flexible tube connected the common outlet of the solenoid valves to the connecting aperture of the nozzle (for example the tube 23 in FIG. 1 of the aforementioned document FR 2 764 544). In this design, the dead volume was very large, in particular due to the presence of the flexible tube for remote connection.

In a subsequent design, the dead volume has been markedly reduced by eliminating the flexible connecting tube and by mounting the solenoid valve block directly on the body of the nozzle, at the location for connecting the tube 23 in FIG. 1 of the document FR 2 764 544. Nevertheless, in this design which currently continues to exist, the juxtaposition of the two respective bodies of the solenoid valve block and of the nozzle further necessitates fluid passages of a sizeable length, which results in a dead volume which is still too large in terms of consumption. As a result, users uphold their demand for a still lower consumption of pressurized fluid, so as to reduce further the consumption of electrical energy.

Furthermore, the presence of solenoid valve blocks located remotely from the nozzle or juxtaposed therewith leads to a heavy and awkward assembly.

BRIEF DESCRIPTION OF THE INVENTION

The object of the invention is, therefore, to attempt to satisfy, as far as possible, these continued requirements of users and to propose an improved arrangement of the blowing device which leads to a very substantial reduction in the dead volumes in the circuit for supplying pressurized fluid to the blank arranged in the molding cavity of the mold and which may also lead to lighter and more compact structural assemblies.

To these ends, a blowing device as set forth in the preamble is characterized, being designed in accordance with the invention, in that a body associated mechanically with the nozzle incorporates at least one housing which is adapted to accommodate one respective solenoid valve, which is selectively in communication with the nozzle.

Due to this integrated structure, the outlet of the solenoid valve is moved considerably closer to the end of the nozzle, and as a result the dead volume is considerably reduced in accordance with the principal object sought.

It will be noted that such an integrated arrangement also offers additional advantages: the elimination of the base for mounting the solenoid valves and possibly the flexible connection, results in a saving in cost (more economical arrangement), a saving in space (possibility of a more compact arrangement and/or space available for mounting other components) and a saving in weight (reduction in the inertia on a rotating structure of the carousel type).

In a preferred embodiment relating, in particular, to nozzles in positive cooperation with the neck of the blanks, it is the body supporting the nozzle which is provided with the above housing. Nevertheless, in a further possible embodiment which relates to devices in which the nozzle is provided with a bell-shaped end part, it is the body of said bell which is designed with said housing. In the embodiments, it may be provided that the housing extends parallel to the axis of the nozzle from the upper face of the body, or that the housing extends radially from the nozzle, or even that the housing extends transversely to the nozzle, by being offset laterally relative to a bore accommodating said nozzle.

In a first possible embodiment of the arrangements according to the invention, each housing may be machined so as to form the respective chamber of the mobile core of the solenoid valve; in other words, the respective part of the body is machined, so as not only to form the housing there, but also so that said housing is adapted to receive directly the mobile core of the solenoid valve. This solution offers the advantage of a maximum reduction of the number of component parts and may achieve a substantial saving in the dead volumes; nevertheless, this maximally integrated structure is shown to be impractical for maintenance, as dismantling is lengthy and/or in the case of a serious problem on the chamber of the solenoid valve, the entire corresponding part of the body has to be replaced.

As a result, a preferred implementation of the arrangements of the invention consists in that each housing is formed to receive a respective solenoid valve cartridge, i.e. a solenoid valve structure comprising a casing defining a chamber accommodating the mobile core. Maintenance is therefore carried out by simply replacing the cartridge, such an operation being easy and rapid to implement.

Whatever the solution retained, however, it is preferable, still with the purpose of facilitating maintenance, that the control device of the solenoid valve is mounted externally on the housing.

In an advantageous version of the device of the invention, an exhaust solenoid valve is provided and a device acting as a silencer is associated with this exhaust solenoid valve; the control device of this exhaust solenoid valve may thus be mounted at the end of said silencer device, or possibly at the inside of said device shaped as a tubular chamber.

Finally, from the need to make savings on the pressurized fluid production station, it may be provided to implement two solenoid valves in the exhaust circuit and to provide the nozzle body with two housings for these two respective solenoid valves, one of these solenoid valves being associated with a circuit for recycling or reusing air (for example by being directed towards a source at reduced pressure) and the other solenoid valve serving to complete the step of discharging to the atmosphere. In such a case, it is this latter solenoid valve which would be associated with the aforementioned silencer device.

Still with the object of maximum reduction of the dead volumes, it may also be provided that at least the pre-blowing and blowing solenoid valves and the respective housings thereof are designed such that in the closed position the respective front faces of the respective valve members of said solenoid valves are flush with the inner wall of the nozzle.

For clarification, in a typical example where three solenoid valves are installed, the dead volume may, by implementing the arrangements of the invention, be reduced to a size of 18.5 $cm^3$, in contrast with approximately 187 $cm^3$ in a current arrangement, namely a considerable saving in the order of 168 $cm^3$.

BRIEF DESCRIPTION OF THE DRAWINGS

The invention will be better understood by reading the detailed description which follows of certain preferred embodiments given by way of purely illustrative and non-limiting example. In this description, reference is made to the accompanying drawings in which:

FIG. 4 is a very schematic and simplified perspective and lateral view, showing a further variant of implementing the arrangements of the invention; and FIG. 5 is a partial view showing a variant of the arrangements shown in FIG. 2A.

DETAILED DESCRIPTION OF THE INVENTION

Figure 1:
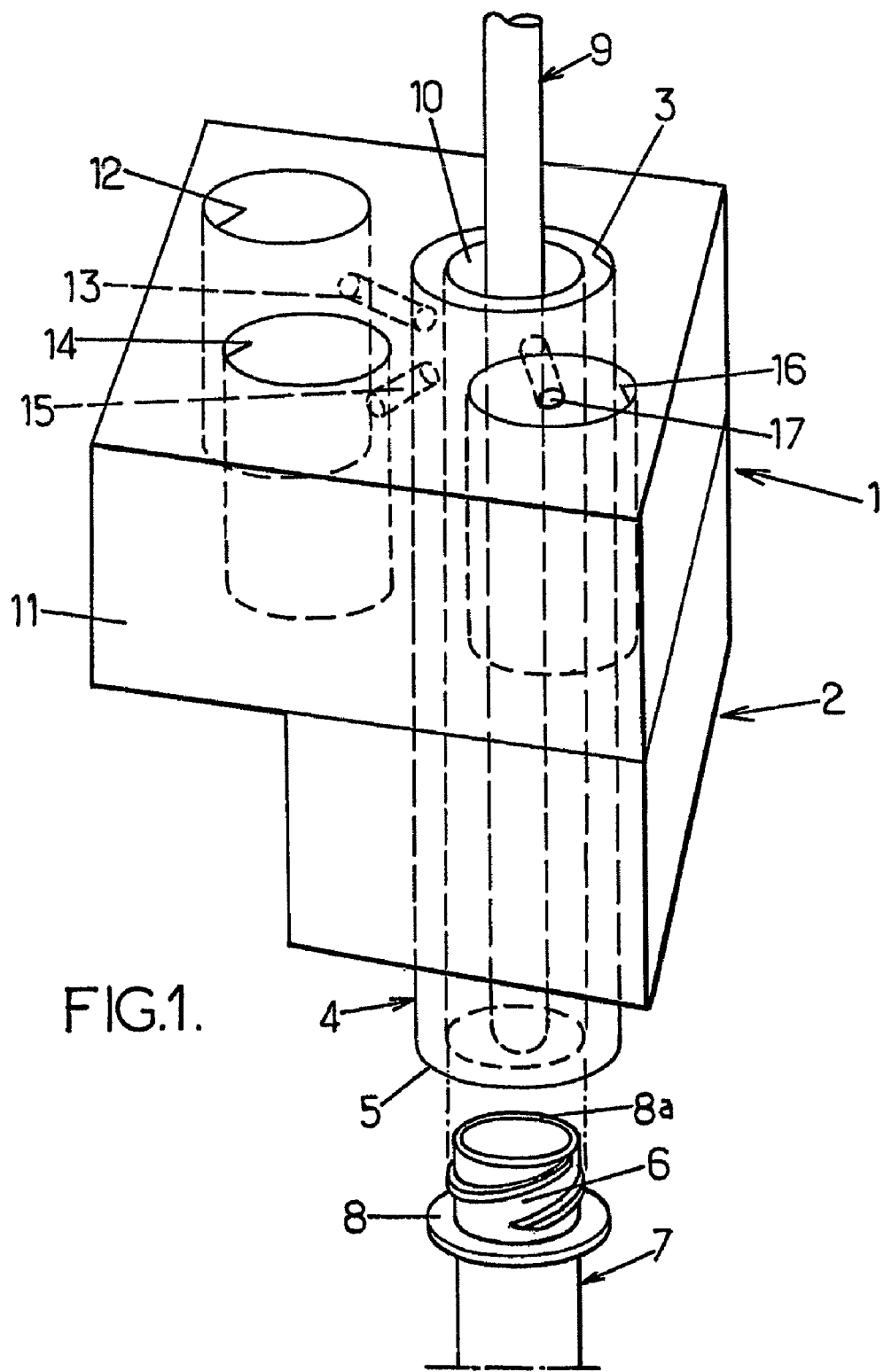
FIG. 1 is a very schematic perspective and lateral view, showing the principal arrangements of a blowing device designed according to the invention.

FIG. 1, to which reference will be made firstly, shows in a very schematic manner a simplified structure of a blowing device implementing the principal arrangements of the invention applied to a device provided with three solenoid valves (respectively pre-blowing, blowing, exhaust). The blowing device, denoted in its entirety by the reference numeral 1, comprises a body 2 having an axial bore 3 in which may be displaced, under the action of generally pneumatic control means (not shown), a mobile element or mobile nozzle 4 in the form of a tubular rod of which one part (not shown) may be designed in the shape of a piston. For clarification, the mutual arrangement of the body 2 and of the mobile nozzle 4 may, for example, be of the type shown in FIG. 1 of the document FR 2 764 544. At its lower end 5, the mobile nozzle 4 is formed in any desired manner to be able to be functionally and sealingly connected to the neck 6 or mouth of a blank 7 of a container (shown here in the form of a preform); in the example shown, the lower end 5 is designed, when the mobile nozzle 4 is lowered, to cap the neck 6 of the blank 7 in a sealed manner and to be brought to bear against the flange 8 located at the base of said neck; the lower end 5 could also be designed to be brought to bear sealingly against the lip or edge 8a of the neck 6, or even be shaped as a bell surrounding the neck 6 remotely and bearing sealingly against the face of the mold, beyond which the neck 6 and the flange 8 project.

In a conventional manner, the mobile nozzle 4 in the form of a tubular rod surrounds an elongating rod 9 which is coaxial thereto and which itself may be axially displaced, during blowing, for mechanically driving the base of the blank 7 according to a known technique. The elongating rod 9 is maintained in a coaxial position by guide members, not shown in this figure. The diameter of the elongating rod 9 is less than that of the inner face of the mobile nozzle 4 so as to define an annular axial passage 10 designed for the supply of pre-blowing fluid and blowing fluid and for the discharge of said fluid at the end of the molding process.

For controlling the supply and discharge of the pre-blowing/blowing fluid, at least three respective solenoid valves are provided for connecting the annular passage 10 to one respective source of fluid at moderate pressure (typically $7 \times 10^5$ Pa) for the pre-blowing, a source of fluid at high pressure (typically $40 \times 10^5$ Pa) for the blowing and an exhaust for discharging the pre-blowing/blowing fluid.

In the arrangements currently known, the solenoid valves were arranged on the outside of the body 2, either remotely thereto (document FR 2 764 544) or flat against an external face thereof.

According to the invention, these solenoid valves are incorporated in the body 2. As shown schematically in FIG. 1, the upper part 11 of the body 2 is produced in the form of a part which is thicker than previously and at least three housings are made there to accommodate the three respective solenoid valves, namely:

a housing 12 designed to accommodate the pre-blowing solenoid valve and brought into communication with the annular passage 10 by a radial conduit 13;

a housing 14 designed to accommodate the blowing solenoid valve and brought into communication with the annular passage 10 by a radial conduit 15;

a housing 16 designed to accommodate the exhaust solenoid valve and brought into communication with the annular passage 10 by a radial conduit 17.

In the simplified drawing given in FIG. 1, only the housings of the solenoid valves are shown, whilst the solenoid valves themselves are not shown (concrete examples thereof will be given below).

In the example of FIG. 1, the housings 12, 14 and 16 are schematized in the form of rotating cylindrical housings with axes substantially parallel to the axis of the aforementioned bore 3. Nevertheless, other arrangements are possible and examples will be given below.

So that at the end of blowing the blowing fluid is discharged very rapidly and so that the mold might be opened as quickly as possible in view of increased functioning speed, it is desirable that the exhaust conduit be oversized, as shown for the radial conduit 17. After blowing, the fluid which is discharged is still at a significant pressure and may be recuperated to be directed toward a source of fluid at moderate pressure (for example for the pre-blowing). In this case, a fourth housing is provided in the body 2 to receive a solenoid valve for recycling (which is actuated after blowing, whilst the exhaust solenoid valve is actuated last for the elimination of the remainder of the blowing fluid).

It could be provided that each housing 12, 14, 16 is machined so as to define, directly in the body 2, the chamber of the solenoid valve adapted to accommodate the mobile core forming the opening/closing valve member. Such a solution certainly offers the advantage of optimal structural simplification. This solution may have an additional advantage which will be examined below. Nevertheless, this solution also leads to restrictions for maintenance: in the event of problems with a solenoid valve, it is the whole of the relevant part of the body 2, even the body 2 in its entirety, which has to be dismantled, even replaced. A longer time for maintenance and increased costs result.

To avoid these drawbacks, it may therefore prove more advantageous as a whole to resort to solenoid valve cartridges, available in the form of a module adapted to be positioned in a respective housing or to be easily and rapidly withdrawn therefrom. This solution is, therefore, particularly economical for maintenance.

It will be noted that the housings 12, 14, 16 are designed to receive the respective solenoid valve itself (i.e. the chamber accommodating the mobile core forming the valve member and the seat thereof), the cover of the solenoid valve bearing externally against the face of the mold, whilst the control device of the solenoid valve remains outside the housing: a concrete example of the arrangement will be indicated below.

Figure 2A:
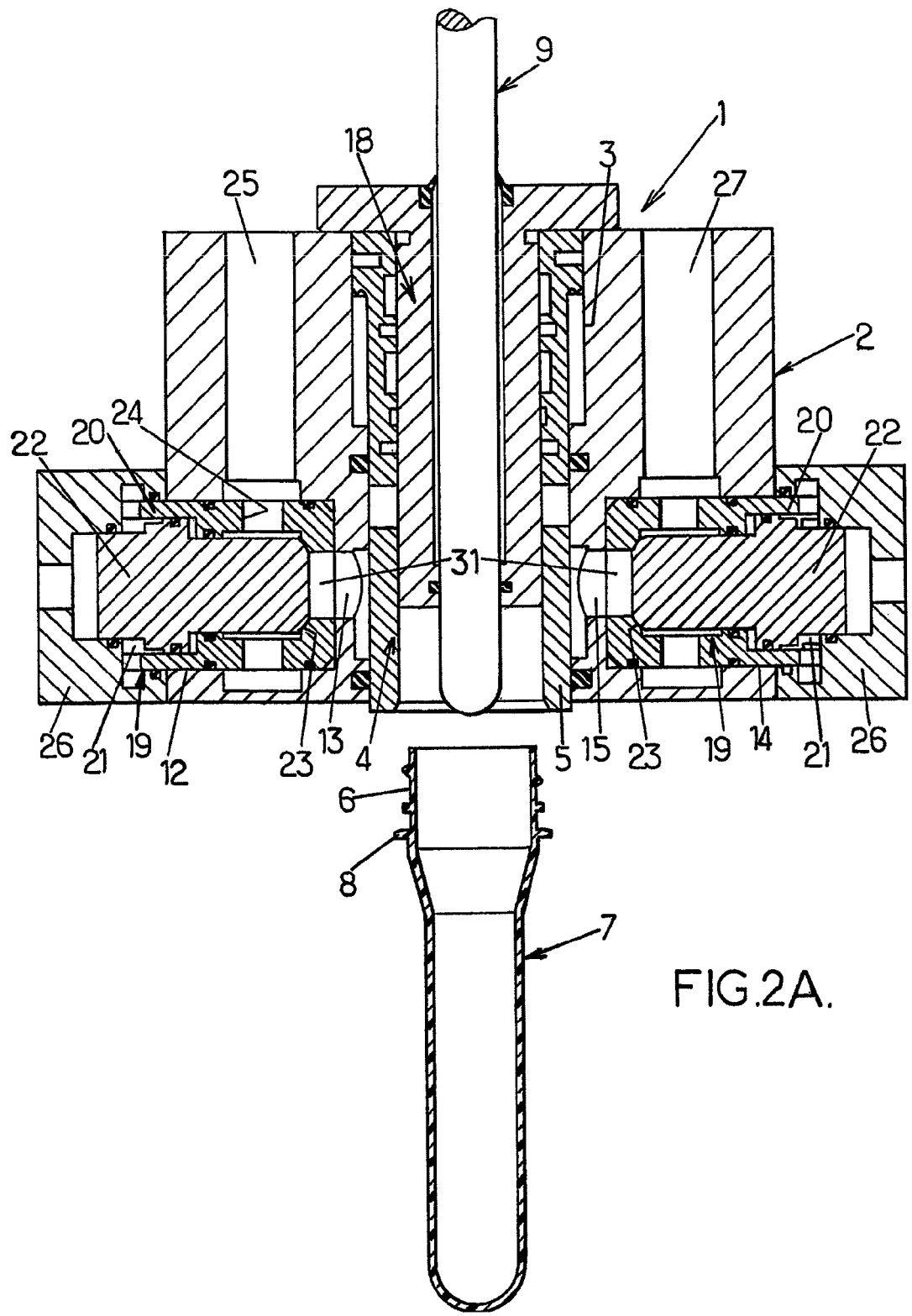
FIGS. 2A and 2B are views in transverse section, respectively offset by 90° relative to one another, of a concrete embodiment of a blowing device according to the invention, with the implementation of a variant of the arrangements of FIG. 1.
Figure 2B:
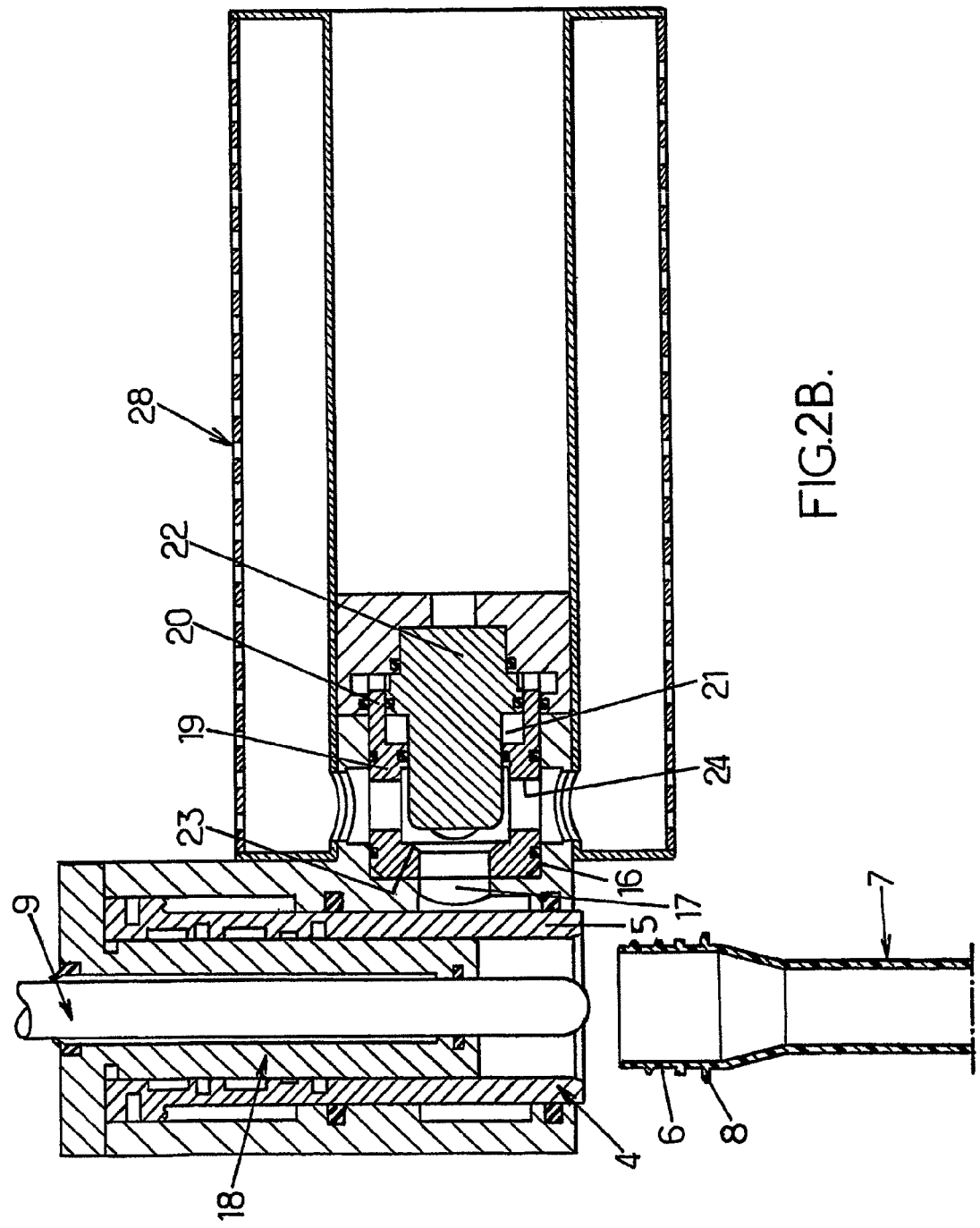
Figure 2C:
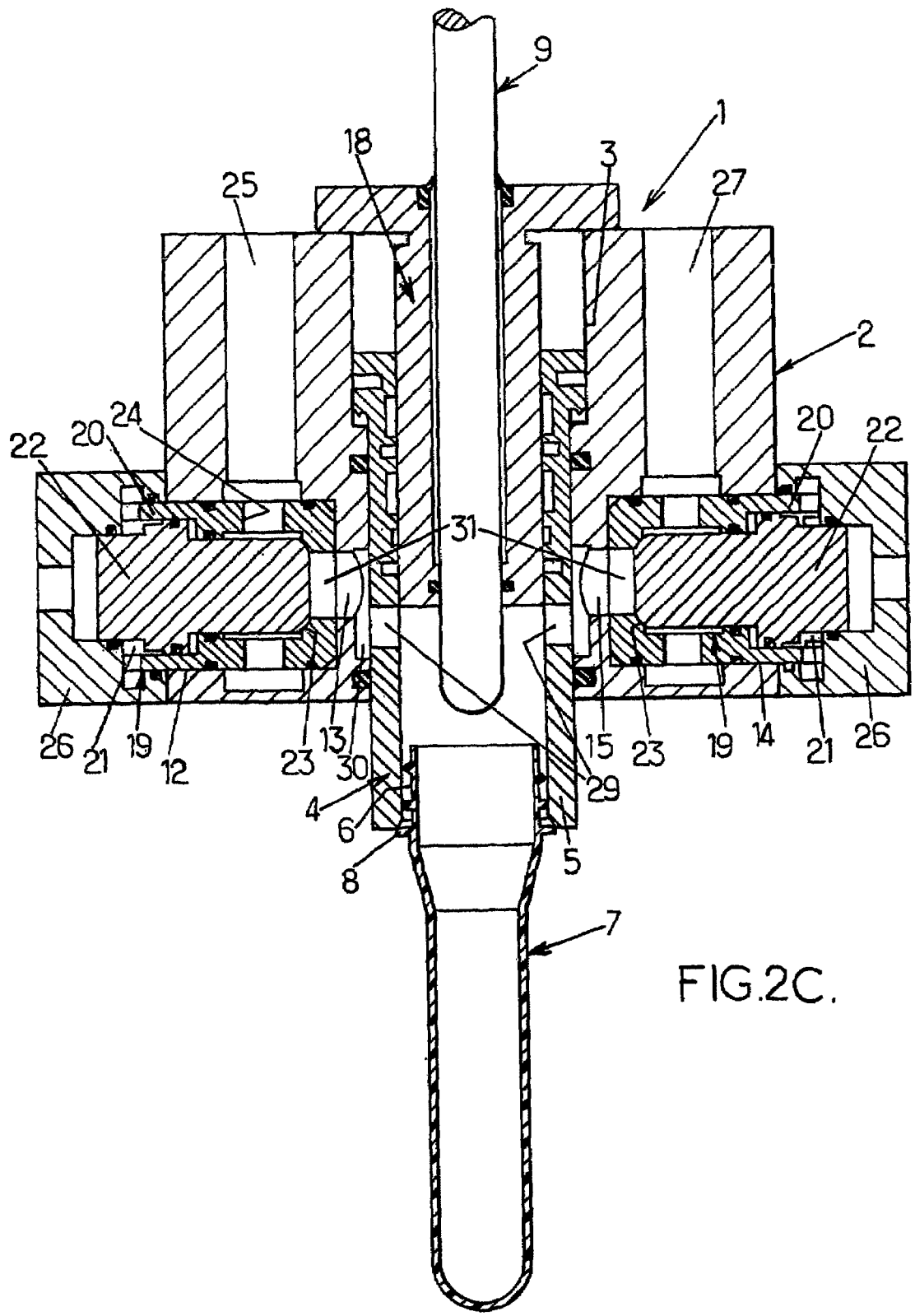
FIG. 2C is a view similar to that of FIG. 2A, with the nozzle lowered onto the blank to be blown and ready for the blowing process.

FIGS. 2A, 2B and 2C show a concrete embodiment implementing a variant of the arrangements of FIG. 1. In this concrete embodiment, the housings 12, 14 (FIG. 2A) and 16 (FIG. 2B) are arranged radially around the bore 3, such that the body 2 may be produced in a much more compact form in the axial direction. Furthermore, the manufacture of the body is simplified and the access to the solenoid valves for maintenance is easier.

FIGS. 2A, 2B and 2C clearly show the guide means, integral with the body 2, of the elongating rod which comprise a tubular guide part 18 interposed between the elongating rod 9 which is inside thereof and the mobile nozzle 4 which is outside thereof.

The housing 12 which extends radially to the base of the body 2 accommodates a solenoid valve cartridge 19. The solenoid valve cartridge 19 comprises a housing 20 defining a chamber 21 accommodating a mobile core 22 or piston. The housing 20 defines, in the chamber 21, a seat 23 adapted to receive in sealing abutment the head of the mobile core 22 forming the valve member. The wall of the housing 20 is perforated by at least one aperture 24 communicating with a conduit 25 for supplying pre-blowing fluid at moderate pressure, said conduit 25 passing through the body 2 substantially parallel to the bore 3.

A cover 26 for closing the housing 20 of the solenoid valve is fixed to the wall of the body 2. The control device (not shown in these figures), generally of the pneumatic type, may be mounted on this cover 26.

The housing 20 of the solenoid valve cartridge 19 comprises, at its end turned radially inwards, a hole aligned with the respective aforementioned radial conduit 13, perforated in the base of the housing 12 and opening out into the bore 3, these two aligned holes together constituting a radial conduit denoted in its entirety by the reference numeral 31.

The housing 14 which extends radially opposite the housing 12, being diametrically opposed thereto, accommodates an identical solenoid valve cartridge, with an identical arrangement to that disclosed above, connected to a conduit 27 for supplying blowing fluid at high pressure.

The housing 16 (FIG. 2B) which extends radially by being offset by 90° relative to the aforementioned housings 12 and 14, accommodates an identical solenoid valve cartridge, with an identical arrangement to that disclosed above, with the exception that the chamber 21 of the solenoid valve cartridge is shown (by way of example) in connection with a silencer device 28; the communication apertures 24 may, in this case, have a larger section and/or be of greater number. The silencer device 28 is shown in the form of a double-walled tubular element defining an elongated annular chamber. Said tubular element is fitted onto a projecting cylindrical part of the body 2 defining the housing 16; its external wall is perforated by a multiplicity of exhaust holes. The solenoid valve control device (not shown) may be mounted on the body 2 inside the silencer device 28 or even mounted at the free end of the silencer device.

The blowing device 1 is shown in FIGS. 2A and 2B in the non-functioning position, the pre-blowing solenoid valves (housing 12) and blowing solenoid valves (housing 14) being closed and the exhaust solenoid valve (housing 16) being open, the mobile nozzle 4 and the elongating rod 9 being retracted. In FIG. 2C (which is a view similar to that of FIG. 2A) the blowing device 1 is shown in a first position, ready for pre-blowing, but the pre-blowing solenoid valve (housing 12) is not yet actuated. In this first position, only the mobile nozzle 4 has been actuated and brought into position on the neck 6 of the blank 7 which it caps in a sealed manner by bearing against the flange 8. In this position, radial apertures 29 distributed over the periphery of the mobile nozzle 4, are exposed by the tubular guide part 18 of the guide means and establish a link between the volume defined by the blank 7 and the lower end of the mobile nozzle 4, on the one hand, and, on the other hand, an annular counterbore 30 which is made in the face of the bore 3 and into which the conduits 31, for communicating with the three respective solenoid valves, open.

Figure 3:
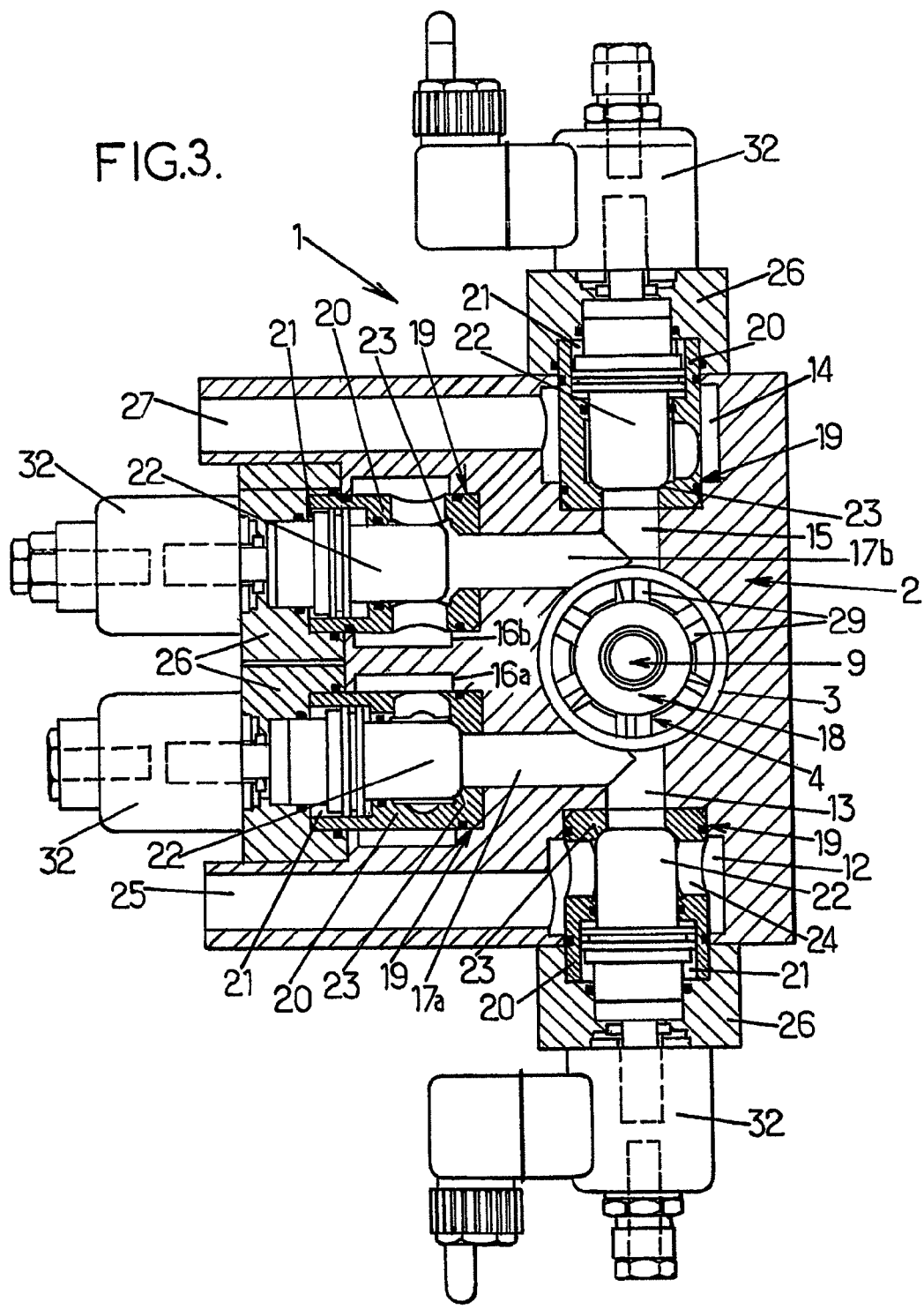
FIG. 3 is a view from above, in section, of a concrete embodiment of a blowing device according to the invention, showing a variant of the nozzle of FIGS. 2A-2C.

In FIG. 3 a concrete variant of the blowing device 1 of FIGS. 2A-2C is shown in plan view. The design of the assembly remains substantially similar to that disclosed above (the control devices 32 being shown in this case in position on the covers 26 of the solenoid valves) with the exception, however, that a supplementary solenoid valve is provided for recycling the residual pressurized fluid at the end of the blowing step, in place of the single exhaust solenoid valve shown in FIG. 2B. To this end, the body 2 comprises two parallel housings 16a, 16b, respectively connected by two respective conduits 17a, 17b, no longer directly to the bore 3, but to the radial conduits 13 and 15, respectively, associated with the housings 12 and 14.

In a very schematic manner, a further variant of a blowing device implementing the arrangements according to the invention is shown in FIG. 4. In this FIG. 4, only the body 2 is shown with the bore 3, in addition to the three housings 12, 14, 16 which communicate with the bore 3 by respective radial conduits 13, 15 and 17 and which are designed to accommodate the pre-blowing, blowing and exhaust solenoid valves respectively. This variant differs from that of FIG. 1 by the arrangement of housings 12, 14 and 16 which are not parallel to the bore 3, but which are transverse to said bore and also differs from those of FIGS. 2A-2C and 3 by the fact that the housings are not radial, but offset laterally to the bore 3. This arrangement, as those of FIGS. 2A-2C and 3, allows the height of the body 2 to be markedly reduced and maintains the bore 3 in a central position in the body. If necessary, a fourth housing may be provided for a recycling solenoid valve; nevertheless, this arrangement requires free access to be available to the four sides of the body 2, which may not be possible in certain configurations of the device.

An advantage with this compact configuration lies in the fact that it may be implemented not in the body supporting the mobile nozzle 4 but directly in the bell-shaped end of a bell nozzle (type of nozzle shown in FIG. 1 of the document FR 2 764 544): the body 2 shown in FIG. 4 is thus the body of the bell arranged according to the invention.

The arrangements according to the invention lead to a very marked reduction in the dead volume, and thus to a very significant reduction in the volume of pressurized fluid required for the pre-blowing/blowing of a container. For clarification, in a conventional blowing device having a dead voluume in the order of 186 $cm^3$, the implementation of integrated solenoid valves in the body of the blowing device may make it possible to conceive reducing the dead volume to approximately 18 $cm^3$, namely a remarkable saving of 168 $cm^3$.

If the arrangement shown in FIG. 2A is considered with each solenoid valve arranged radially relative to the central bore 3, it is possible to reduce further the dead volume constituted by the conduit 31 forming the communication through the lateral wall of the body defining the bore 3 and the end wall of the housing 20 of the solenoid valve. In FIG. 5, only one part (the part located on the left) of FIG. 2A is reproduced, showing a single solenoid valve, with the difference that the mobile core 22 is, in this case, mounted directly in the housing 14, machined to this end, according to a configuration mentioned above. In this case, the chamfered conical edge of the front face 34 of the mobile core 22 cooperates with an annular tapered seat 33 which is formed at the end, turned towards the inside, of the housing 14, by being machined directly in the body 2. The conicity of the seat 33 may thus be such that the front face 34 of the piston is flush with the lateral wall of the bore 3. This front face 34 may preferably be curved inwards so as to be within the continuity of said lateral wall of the bore 3. The conduit 27 may thus open out as near as possible to the seat 33, such that due to this arrangement, the dead volume downstream of the mobile core 22, between the conduit 27 and the bore 3, may be very significantly reduced.

What is claimed is:

1. A device for blowing, by means of a pressurized fluid, containers from thermoplastic blanks of which the body is enclosed in a blowing mold, said device comprising a nozzle comprising an end formed to be functionally and sealingly connected to the neck of a blank and comprising a plurality of solenoid valves for selectively connecting said nozzle to, respectively, a source of fluid at moderate pressure for pre-blowing, a source of fluid at high pressure for blowing and an exhaust for discharging the pre-blowing/blowing fluid, wherein a body associated mechanically with the nozzle incorporates at least one housing which is adapted to accommodate one of the solenoid valves and which is selectively in communication with the nozzle,
   wherein each housing extends parallel to the axis of the nozzle from the upper face of the body, and
   wherein each housing is formed to receive a respective solenoid valve cartridge.

2. The device as claimed in claim 1, wherein it is the body supporting the nozzle which is provided with said housing.

3. The device as claimed in claim 1 in which the nozzle is terminated below by a bell-shaped end part, wherein it is the body of the bell terminating the nozzle which is designed with the housing.

4. The device as claimed in claim 1, wherein the device for controlling the solenoid valve cartridge is mounted outside the housing.

5. The device as claimed in claim 4, further comprising an exhaust solenoid valve associated with a device acting as a silencer.

6. The device as claimed in claim 1, wherein the device is equipped with at least two solenoid valves associated respectively with a circuit for recycling pressurized fluid at residual pressure, as a result of the blowing, and with an exhaust and wherein the nozzle body is provided with four housings for these four respective solenoid valves.

7. The device according to claim 1, wherein the housing is configured such that a majority of the solenoid valve is disposed inside of the body in which the housing is formed.

8. The device according to claim 1, wherein the housing comprises a recess formed in the body that extends from an external surface of the body to an axial bore in the body that houses the nozzle.

9. A device for blow-molding thermoplastic containers from blanks disposed in a mold by means of pressurized fluid, the blow-molding device comprising:
- a nozzle comprising a distal end configured to form a seal with the blank or the mold;
- a body comprising an axial bore, wherein the nozzle is slidably engaged in the axial bore;
- at least one solenoid valve for selectively connecting the nozzle to a source of fluid at moderate pressure for pre-blowing, a source of fluid at high pressure for blowing, or an exhaust for discharging the pre-blowing/blowing fluid;
- wherein a majority of the at least one solenoid valve is disposed in a housing in the body; and
- wherein said housing is formed to receive a respective solenoid valve cartridge.

10. The device according to claim 9, wherein the housing comprises a recess formed in the body.

11. The device according to claim 9, wherein the housing extends from an external surface of the body to the axial bore.

12. The device according to claim 9, wherein the housing extends radially from the nozzle, such that a core of the solenoid valve translates in a radial direction relative to the nozzle.

13. The device according to claim 9, wherein the housing is configured such that the a front face of the at least one solenoid valve is flush with the inner wall of the nozzle when the solenoid valve is in a closed position.

14. The device according to claim 1, wherein the housing is configured such that the entire solenoid valve is disposed inside of the body in which the housing is formed.

15. The device according to claim 9, wherein the housing is configured such that the entire solenoid valve is disposed inside of the body in which the housing is formed.

16. A device for blowing, by means of a pressurized fluid, containers from thermoplastic blanks of which the body is enclosed in a blowing mold, said device comprising a nozzle comprising an end formed to be functionally and sealingly connected to the neck of a blank and comprising a plurality of solenoid valves for selectively connecting said nozzle to, respectively, a source of fluid at moderate pressure for pre-blowing, a source of fluid at high pressure for blowing and an exhaust for discharging the pre-blowing/blowing fluid, wherein a body associated mechanically with the nozzle incorporates at least one housing which is adapted to accommodate a solenoid valve and which is selectively in communication with the nozzle;
- wherein each housing extends transversely to the nozzle by being offset laterally relative to a bore accommodating said nozzle; and
- wherein each housing is formed to receive solenoid valve cartridge.

* * * * *